US006572669B1

United States Patent
Creech

(10) Patent No.: US 6,572,669 B1
(45) Date of Patent: Jun. 3, 2003

(54) THIXOTROPIC FERTILIZER COMPOSITION AND ASSOCIATED METHOD

(75) Inventor: J. Buford Creech, Clermont, FL (US)

(73) Assignee: Douglass Fertilizer & Chemical, Inc., Altamonte Springs, FL (US)

(*) Notice: Subject to any disclaimer, the term of this patent is extended or adjusted under 35 U.S.C. 154(b) by 0 days.

(21) Appl. No.: 09/363,767

(22) Filed: Jul. 29, 1999

(51) Int. Cl.[7] .............................. C05F 5/00; C05F 11/00
(52) U.S. Cl. ....................... 71/11; 71/23; 71/27; 71/64.1
(58) Field of Search .......................... 71/23, 27, 64.1, 71/11

(56) References Cited

U.S. PATENT DOCUMENTS

| | | | | |
|---|---|---|---|---|
| 1,282,805 A | * | 10/1918 | Gardiner ......................... | 71/23 |
| 3,207,592 A | * | 9/1965 | Harper et al. ................... | 71/11 |
| 3,950,159 A | * | 4/1976 | Fox et al. ........................ | 71/11 |
| 4,026,694 A | * | 5/1977 | Cross et al. ..................... | 71/27 |
| 4,345,931 A | * | 8/1982 | Meyer ............................ | 71/28 |
| 5,372,626 A | * | 12/1994 | Zivion et al. ................... | 71/11 |
| 5,656,060 A | * | 8/1997 | Townley ......................... | 71/23 |
| 6,051,043 A | * | 4/2000 | Kitten ............................. | 71/11 |
| 6,113,665 A | * | 9/2000 | Lovatt ............................ | 71/11 |

* cited by examiner

Primary Examiner—Wayne A. Langel
(74) Attorney, Agent, or Firm—Allen, Dyer, Doppelt, Milbrath & Gilchrist, P.A.

(57) ABSTRACT

The invention describes a thixotropic fertilizer composition which includes a first aqueous component having a predetermined concentration of divalent cations and of organic matter, and a second aqueous component comprising a predetermined concentration of phosphorus, and having substantially no divalent cations. The first and second aqueous components are mixed in predetermined proportions just prior to application of the fertilizer to produce a thixotropic fertilizer composition having a concentration of divalent cations of substantially from about 1% to about 15% by weight, from about 25% to about 50% by weight of dry organic matter, and from about 1% to about 30% by weight of phosphorus. An apparatus for applying the thixotropic fertilizer includes a plurality of containers, a plurality of conduits, a mixing chamber, a pump, and a nozzle. Also included is a method of fertilizing an agricultural crop comprising the step of applying a thixotropic fertilizer essentially under a soil surface substantially simultaneously with planting the agricultural crop.

34 Claims, 1 Drawing Sheet

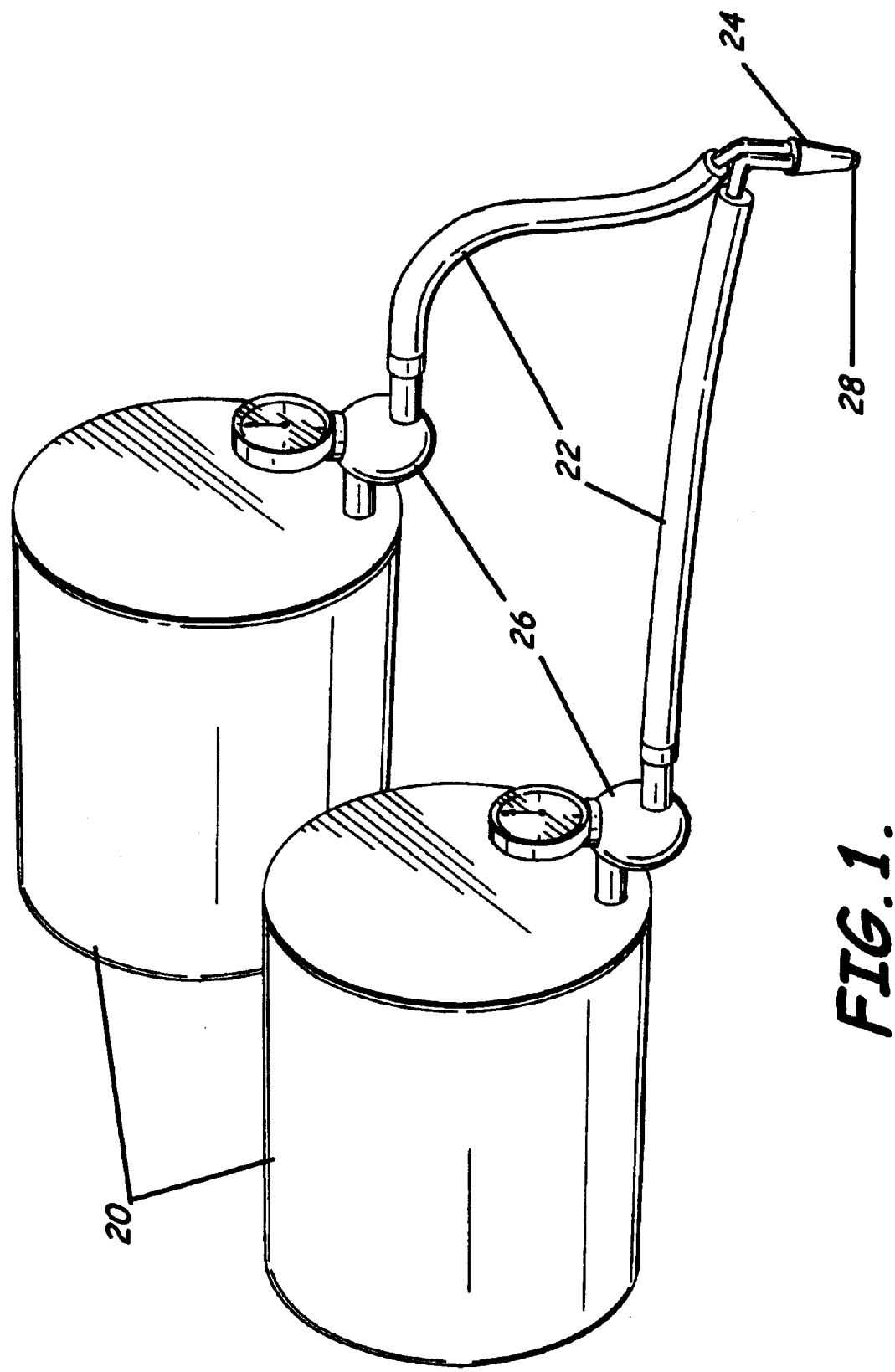

THIXOTROPIC FERTILIZER COMPOSITION AND ASSOCIATED METHOD

FIELD OF THE INVENTION

The present invention relates to the field of fertilizer compositions and, more particularly, to a thixotropic fertilizer suitable for application simultaneously with planting an agricultural crop.

BACKGROUND OF THE INVENTION

Plant fertilizers have been used from earliest human efforts at agriculture. The simplest and most readily accessible fertilizers in many parts of the world have been animal manure, and even human wastes. Chemical fertilizer compositions have been developed for providing more selective and controlled delivery of nutrients and to avoid the well known public health problems associated with use of animal and human waste as fertilizers.

Thixotropy refers to a property of certain materials for forming a gel when undisturbed and becoming fluid when disturbed, such as by shaking or mixing. A thixotropic composition is one which is a gel when at rest, and which becomes liquid when agitated. The property of thixotropy has been previously employed in manufacturing animal feeds and fertilizers. However, in the fertilizer field, thixotropy has been largely perceived as an undesirable characteristic causing unwelcome destruction of suspension fluidity during storage of fertilizer compositions. In this regard, for example, see U.S. Pat. No. 5,022,913, issued to Dillard et al., and describing how to make a stabilized ammonium orthophosphate suspension while avoiding such undesirable gelling.. Gels have also been prepared in dry form for application to the soil, for example, as described in U.S. Pat. No. 5,632,799, issued to Behel et al. on May 27, 1997. A hydrogel formed with crosslinked polyacrylamide has been described in U.S. Pat. No. 5,221,313 by Mortvedt for use as a fertilizer. However, Mortvedt provides a different chemical formulation, necessarily having different properties from the composition herein, and in addition Mortvedt does not suggest a thixotropic gel fertilizer wherein the gel is formed essentially as the fertilizer is being applied. Instead, Mortvedt applies its fertilizer as a preformed gel, admitting that such hydrated gels are rather difficult to apply and that their relatively high cost of application limits their utility to specialty crops such as apples, grapes, and peaches. Mortvedt points out the utility of an economically viable method of application for field crops such as soybeans and grain sorghum. The present invention advantageously describes such a method.

SUMMARY OF THE INVENTION

With the foregoing in mind, the present invention advantageously provides a thixotropic fertilizer composition including a first aqueous component having predetermined concentrations of divalent cations and organic matter, and a second aqueous component having a predetermined concentration of phosphorus and having substantially no divalent cations, wherein the first and second aqueous components are mixed in predetermined proportions to produce the thixotropic fertilizer composition substantially having concentrations of divalent cations of about 1% by weight, of about 25% by weight of dry organic matter, and of about 1% by weight of phosphorus.

The present invention includes an apparatus for applying the thixotropic fertilizer composition. The apparatus includes a plurality of containers, each container of the plurality for containing each liquid component, to thereby keep the liquid components separate from each other. The apparatus further includes a plurality of conduits, each conduit having a first end and a second end, the first end being connected in fluid communication with a container of the plurality of containers for conducting the liquid component therefrom. A mixing chamber is positioned downstream from the plurality of conduits, the second end of each conduit of the plurality being connected in fluid communication with the mixing chamber for conducting thereinto the plurality of liquid components for mixing. A pump is connected in fluid communication with the plurality of containers for pumping the plurality of liquid components through the apparatus. A nozzle is connected in fluid communication with the mixing chamber and is positioned downstream therefrom for delivering the thixotropic fertilizer composition to the soil after mixing, thereby fertilizing the soil.

The invention additionally describes a method of fertilizing an agricultural crop, the method including the step of applying a thixotropic fertilizer substantially simultaneously with planting the agricultural crop. Preferably, the thixotropic fertilizer is applied to the soil essentially under the soil surface, so that when the crop being planted is covered with soil the fertilizer also covered. Additionally included in the invention is a method of making a thixotropic fertilizer, including the steps of: preparing a first aqueous component having predetermined concentrations of divalent cations, and organic matter; preparing a second aqueous component including a predetermined concentration of phosphorus, and substantially no divalent cation; and mixing the first and second aqueous components in predetermined proportions to produce a thixotropic fertilizer composition substantially having concentrations of divalent cations of about 1% by weight, of about 25% by weight of dry organic matter, and of about 1% by weight of phosphorus.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1 illustrates an apparatus for applying thixotropic fertilizer, according to an embodiment of the present invention.

DETAILED DESCRIPTION

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

The present invention includes a thixotropic fertilizer composition having two liquid components. Those skilled in the art will understand that the term "thixotropic" refers to the property of various gels of becoming fluid when disturbed, such as by shaking or stirring, and returning to the gel state upon standing. The thixotropic fertilizer composition described herein includes two aqueous components which when mixed together become a gel, thereby having the useful property of providing a fertilizer which is stored and applied substantially as a liquid, but becomes relatively positionally stable in the soil due to its gelling property.

The first aqueous component includes a predetermined concentration of divalent cations, and of organic matter. The second aqueous component includes a predetermined concentration of phosphorus, and includes substantially no divalent cations. Skilled workers in the fertilizer art will appreciate that the term "phosphorus", as used herein, is intended to preferably mean the phosphate $P_2O_5$, which is a typical form of phosphorus included in fertilizer compositions and is often provided by the compound ammonium polyphosphate. In a preferred embodiment of the invention, the first and second aqueous components are mixed in predetermined proportions to produce the thixotropic fertilizer composition having a concentration of divalent cations of substantially about 5% by weight, of about 25% by weight of dry organic matter, and of about 5% by weight of phosphorus. The first and second aqueous components may also be prepared having predetermined concentrations of ingredients such that they can be blended in substantially equal parts during application to the soil to result in the thixotropic fertilizer. The phosphorus concentration in the thixotropic fertilizer gel of the present invention may preferably vary from about 1% to 30%, and the concentration of divalent cations may preferably vary from about 1% to 15%. Skilled artisans will understand that because the gelling reaction is dependent on the concentrations of phosphorus and divalent cations, their respective concentrations may be varied, depending on the desired degree of hardness one wishes to impart to the thixotropic fertilizer gel upon formation. Additionally, the phosphorus content of the thixotropic fertilizer may also be modified, according to the native content of phosphorus in the soil to which the fertilizer will be applied. For example, in yet another preferred embodiment, the fertilizer composition includes a first aqueous component containing predetermined divalent cations in a concentration of about 2% by weight, and organic matter in a concentration of about 50% by weight of dry organic matter, and includes a second aqueous component having phosphorus in a concentration of about 2% by weight, and having substantially no divalent cations.

Those knowledgeable in the art will know that the chemical ingredients employed in making the thixotropic fertilizer of the present invention are generally of the standard grades used in the fertilizer industry. The thixotropic fertilizer preferably includes divalent cations selected from calcium, magnesium, iron, manganese, zinc, and mixtures thereof. In addition, the organic matter may be provided by a material selected from molasses, lignin sulfonate, corn steep, hemicellulose extract, all as known in the art, and mixtures thereof. The artisan will also understand that "molasses" may be produced from various agricultural crops, including sugar cane, beets, citrus fruit, and corn. Phosphorus, as $P_2O_5$, is preferably provided from phosphoric acid or ammonium polyphosphate.

The composition of the present invention may further include predetermined concentrations of various plant nutrients, including micronutrients or trace elements. Such plant nutrients may be preferably selected from ammonia and ammonium salts such as ammonium nitrate, boric acid and borate compounds, calcium and calcium salts, copper and copper salts, iron and iron salts, magnesium and magnesium salts, manganese and manganese salts, molybdenum and molybdenum salts, potassium and potassium salts, sodium and sodium salts, sulfur and sulfur compounds, urea and urea compounds, zinc and zinc salts, trace elements such as boron, vanadium and others known in the art, and mixtures thereof. The thixotropic fertilizer composition may further include a herbicide, pesticide, fungicide, or mixtures thereof. However, manufacturing care must be taken when adding plant nutrients or other compounds to avoid mixing divalent cations with the phosphorus containing liquid component, as this will result in gelling of the fertilizer. When applied to the soil, the thixotropic fertilizer preferably has a pH from about 5.5 to about 7.0. Additionally, the aqueous components of the fertilizer may further include a suspension of water insoluble ingredients, in which case skilled artisans will appreciate that some method of maintaining the insoluble material properly mixed in the liquid must be employed.

The present invention also includes an apparatus for soil application of a thixotropic fertilizer composition including a plurality of liquid components, as best shown in FIG. 1. The apparatus preferably includes a plurality of containers 20, each container for containing a liquid component of the fertilizer, to thereby keep the liquid components separate from each other. Also included in the apparatus are a plurality of conduits 22, each conduit having a first end and a second end, the first end being connected in fluid communication with one of the containers for conducting the liquid component therefrom. The apparatus further includes a mixing chamber 24 positioned downstream from the plurality of conduits. The second end of each conduit of the plurality is connected in fluid communication with the mixing chamber for conducting thereinto the plurality of liquid components for mixing. The apparatus preferably also includes a pump 26 connected in fluid communication with the plurality of containers for pumping the plurality of liquid components through the apparatus. A pump included in the apparatus is preferably a pump having metering capability, for thereby regulating the mixing rate and flow of the fertilizer. A nozzle 28 is connected in fluid communication with the mixing chamber and is positioned downstream therefrom, for delivering the thixotropic fertilizer composition to the soil after the components are mixed in the mixing chamber, thereby fertilizing the soil.

Skilled workers will appreciate that the apparatus is designed to keep the components separate until just prior to application of the fertilizer, when the components reach the mixing chamber 24, from where the mix is substantially immediately delivered via the nozzle 28 before the composition gels and clogs the mixing chamber 24 and/or the nozzle 28. The thixotropic property prevents the composition from gelling as long as it is kept agitated, which is accomplished within the mixing chamber 24 by the turbulence generated as the components mix together under pressure created within the apparatus by a pump 26.

In yet another preferred embodiment, the apparatus for applying the fertilizer may be made portable by being connected to a carrier and being suitably sized to thereby allow carriage by a person. A portable apparatus permits manual application of fertilizer to the soil, useful for spot applications and for other small jobs such as home gardening or ornamental landscaping.

The pump 26 in the apparatus may preferably be a fluid compression mechanism for pressurizing the plurality of containers, to thereby force the liquid components to flow through the apparatus. Particularly in a portable embodiment of the apparatus, the fluid compression mechanism is preferably a hand activated air pump for pressurizing the plurality of containers, to thereby force the liquid components to flow through the apparatus. In another preferred embodiment, the apparatus may further include a plurality of variable flow pumps, as seen in FIG. 1, each pump connected in fluid communication with a container, to thereby allow pumping at a different rate from each container, allowing mixing of custom blended thixotropic fertilizers.

The apparatus of the present invention may preferably be operably combined with an agricultural machine used for preparing soil for planting a crop, to thereby allow application of thixotropic fertilizer substantially as the soil is prepared. For such use the nozzle may be positioned relative to the agricultural machine such as to deliver the thixotropic fertilizer essentially under the soil surface as the machine turns the soil for planting the crop. The invention further includes an embodiment wherein the agricultural machine substantially simultaneously turns the soil, fertilizes, and plants a crop.

The invention advantageously also includes a method of fertilizing an agricultural crop comprising the step of applying a thixotropic fertilizer to the soil substantially simultaneously with the planting of an agricultural crop. Preferably, the thixotropic fertilizer is applied to the soil essentially under the soil surface as the soil is turned in preparation for planting. Such a simultaneous, one-step planting operation would be particularly useful where the crop are trees in a forestry operation and the agricultural machine is a tree planter. The method of simultaneous planting and fertilizing will save time and expense by reducing the manpower necessary for the operation.

Included in the invention is also a method of making a thixotropic fertilizer, comprising the steps of preparing a first aqueous component having predetermined concentrations of divalent cations and of organic matter, preparing a second aqueous component having a predetermined concentration of phosphorus and having substantially no divalent cations, and mixing the first and the second aqueous components in predetermined proportions to produce the thixotropic fertilizer composition substantially having by weight concentrations of divalent cations from about 1% to 15%, from about 25% to 50% of dry organic matter, and from about 1% to 30% phosphorus. Those skilled in the art will understand that some agitation and heating may be necessary for dissolving some of the ingredients in the aqueous components, for example the molasses. In contrast, the artisan will know that other ingredients, such as calcium chloride, generate heat when mixed with water and must be handled accordingly.

EXAMPLE

In practice, an embodiment of the thixotropic fertilizer may be prepared in production batches, as illustrated in the following example, in which the weight of ingredients is expressed as pounds per ton (lbs./ton).

The first aqueous component includes: 100 lbs. of potassium chloride having an nitrogen, phosphorus, and potash (NPK) analysis of about 0-0-60; 1500 lbs. of molasses, usually standardized to about 79.5 Brix (a measure of sugar content) and from about 74% to about 78% dry matter; 190 lbs. of calcium chloride; and 210 lbs. of water. The water may be standard municipal supply water, wherein the content of divalent cations will be sufficiently low to not cause unwanted gelling of the fertilizer components. In addition, the water is preferably warmed sufficiently to help dissolve the molasses with mechanical stirring being provided. The calcium chloride may be added following the molasses and after the solution has cooled somewhat, since calcium chloride generates heat upon dissolving. Potassium chloride is usually added last, and dissolves fairly easily with stirring in a few minutes.

The second aqueous component includes: 1100 lbs. of ammonium polyphosphate, having an NPK analysis of about 10-34-0; 267 lbs. of potassium chloride, with an NPK analysis of about 0-0-60; 150 lbs. of phosphoric acid, having an NPK analysis of about 0-75-0; and 483 lbs. of water.

The components of thixotropic fertilizer are blended together substantially immediately prior to application of the fertilizer. In the embodiment presented in this example, the components may be delivered such that the first aqueous component is applied at a rate of about 12 gallons per acre, and the second aqueous component is applied at a rate of about 18 gallons per acre. These rates will result in fertilizer delivery of approximately 20 lbs. per acre of nitrogen, 50 lbs. per acre of phosphorus (as $P_2O_5$), 21 lbs. per acre of potash (as $K_2O$), and 5 lbs. per acre of calcium.

In the drawing and specification, there have been disclosed typical preferred embodiments of the invention, and although specific terms are employed, the terms are used in a descriptive sense only and not for purposes of limitation. The invention has been described in considerable detail with specific reference to these illustrated embodiments.. It will be apparent, however, that various modifications and changes can be made within the spirit and scope of the invention as described in the foregoing specification and as defined in the appended claims.

That which is claimed:

1. A water soluble thixotropic gel fertilizer composition comprising at least two aqueous liquid components blended together, the composition thereafter becoming a gel while at rest and a liquid when exposed to motion energy, said composition comprising:

a first aqueous component comprising divalent cations in a concentration of about 2% by weight, and organic matter in a concentration of about 50% by weight; and a second aqueous component comprising phosphorus in a concentration of about 2% by weight, and capable of forming said thixotropic gel when blended with said first aqueous component.

2. The composition of claim 1, wherein said divalent cations are provided in a concentration of about 10% by weight.

3. The composition of claim 1, wherein said divalent cations are calcium, magnesium, iron, manganese, zinc, or mixtures thereof.

4. The composition of claim 1, wherein said organic matter is provided by molasses, lignin sulfonate, corn steep, hemicellulose extract, or mixtures thereof.

5. The composition of claim 1, wherein said phosphorus is provided in a concentration of about 10% by weight.

6. The composition of claim 1, wherein said phosphorus is provided by phosphoric acid, ammonium polyphosphate, or mixtures thereof.

7. The composition of claim 1, further comprising plant nutrients selected from the group consisting of ammonia and ammonium salts, boric acid and borate compounds, calcium and calcium salts, copper and copper salts, iron and iron, salts, magnesium and magnesium salts, manganese and manganese salts, molybdenum and molybdenum salts, potassium and potassium salts, sodium and sodium salts, sulfur and sulfur compounds, urea and urea compounds, zinc and zinc salts, trace elements, and mixtures thereof.

8. The composition of claim 1, wherein the thixotropic fertilizer has a pH from about 5.5 to about 7.0.

9. The composition of claim 1, wherein at least one of said first and second aqueous components further includes a suspension of a water insoluble ingredient.

10. A thixotropic fertilizer composition comprising:

a first aqueous component having divalent cations, and organic matter; and a second aqueous component comprising phosphorus, and lacking sufficient divalent cations for gel formation;
wherein the first and second aqueous components when proportionately blended produce the thixotropic fertilizer composition having a concentration of divalent cations from about 1% to about 15% by weight, a concentration from about 25% to about 50% by weight of organic matter, and a concentration from about 1% to about 30% by weight of phosphorus.

11. A method of fertilizing a crop being planted in a plant growth medium, the method comprising applying the thixotropic fertilizer of claim 10 under the plant growth medium as the crop is planted.

12. A method of fertilizing soil for growing an agricultural crop, the method comprising applying the thixotropic fertilizer of claim 10 to the soil substantially simultaneously with planting said agricultural crop.

13. An aqueous thixotropic fertilizer composition which gels when at rest, said composition comprising a concentration of divalent cations from about 1% to about 15% by weight, a concentration from about 25% to about 50% by weight of organic matter, and a concentration from about 1% to about 30% by weight of phosphorus.

14. The composition of claim 13, wherein said divalent cations are provided in a concentration of about 10% by weight.

15. The composition of claim 13, wherein said divalent cations are calcium, magnesium, iron, manganese, zinc, or mixtures thereof.

16. The composition of claim 13, wherein said organic matter is provided by molasses, lignin sulfonate, corn steep, hemicellulose extract, or mixtures thereof.

17. The composition of claim 13, wherein said phosphorus is provided in a concentration of about 10% by weight.

18. The composition of claim 13, wherein said phosphorus is provided by phosphoric acid, ammonium polyphosphate, or mixtures thereof.

19. The composition of claim 13, further comprising plant nutrients selected from the group consisting of ammonia and ammonium salts, boric acid and borate compounds, calcium and calcium salts, copper and copper salts, iron and iron salts, magnesium and magnesium salts, manganese and manganese salts, molybdenum and molybdenum salts, potassium and potassium salts, sodium and sodium salts, sulfur and sulfur compounds, urea and urea compounds, zinc and zinc salts, trace elements, and mixtures thereof.

20. The composition of claim 13, wherein the thixotropic fertilizer has a pH from about 5.5 to about 7.0.

21. The composition of claim 13, further comprising a suspension of at least one water insoluble ingredient.

22. A method of fertilizing a crop being planted in a plant growth medium, the method comprising applying the thixotropic fertilizer composition of claim 13, under the plant growth medium as the crop is planted.

23. A method of fertilizing soil for growing an agricultural crop, the method comprising applying the thixotropic fertilizer composition of claim 13, to the soil substantially simultaneously with planting said agricultural crop.

24. An aqueous thixotropic fertilizer composition which gels when at rest, said composition made by combining divalent cations from about 1% to about 15% by weight, with from about 25% to about 50% by weight of organic matter, and with from about 1% to about 30% by weight of phosphorus.

25. The composition of claim 24, wherein said divalent cations are provided in a concentration of about 10% by weight.

26. The composition of claim 24, wherein said divalent cations are calcium, magnesium, iron, manganese, zinc, or mixtures thereof.

27. The composition of claim 24, wherein said organic matter is provided by molasses, lignin sulfonate, corn steep, hemicellulose extract, or mixtures thereof.

28. The composition of claim 24, wherein said phosphorus is provided in a concentration of about 10% by weight.

29. The composition of claim 24, wherein said phosphorus is provided by phosphoric acid, ammonium polyphosphate, or mixtures thereof.

30. The composition of claim 24, further comprising the addition of plant nutrients selected from the group consisting of ammonia and ammonium salts, boric acid and borate compounds, calcium and calcium salts, copper and copper salts, iron and iron salts, magnesium and magnesium salts, manganese and manganese salts, molybdenum and molybdenum salts, potassium and potassium salts, sodium and sodium salts, sulfur and sulfur compounds, urea and urea compounds, zinc and zinc salts, trace elements, and mixtures thereof.

31. The composition of claim 24, wherein the pH is adjusted from about 5.5 to about 7.0.

32. The composition of claim 24, further comprising addition of a suspension of at least one water insoluble ingredient.

33. A method of fertilizing a crop being planted in a plant growth medium, the method comprising applying the thixotropic fertilizer composition of claim 24 under the plant growth medium as the crop is planted.

34. A method of fertilizing soil for growing an agricultural crop, the method comprising applying the thixotropic fertilizer composition of claim 24 to the soil substantially simultaneously with planting said agricultural crop.

* * * * *